(12) United States Patent
McGlinchey et al.

(10) Patent No.: US 7,574,625 B2
(45) Date of Patent: Aug. 11, 2009

(54) ACTIVE CONTENT WIZARD TESTING

(75) Inventors: Andrew J. McGlinchey, Seattle, WA (US); Aravind Bala, Redmond, WA (US); Jefferson D. Fletcher, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 847 days.

(21) Appl. No.: 10/940,479

(22) Filed: Sep. 14, 2004

(65) Prior Publication Data
US 2006/0059433 A1    Mar. 16, 2006

(51) Int. Cl.
*G06F 11/00* (2006.01)

(52) U.S. Cl. .................... 714/38; 714/39; 715/273; 715/705; 715/708; 715/731; 703/17; 703/22

(58) Field of Classification Search ............ 714/37, 714/38, 48, 25; 717/114, 125, 126; 702/123; 715/762, 705, 709, 726; 703/22; 707/10, 707/104
See application file for complete search history.

(56) References Cited

U.S. PATENT DOCUMENTS

| | | | |
|---|---|---|---|
| 5,481,667 A | 1/1996 | Bieniek et al. | 715/709 |
| 5,535,422 A | 7/1996 | Chiang et al. | 395/155 |
| 5,550,967 A * | 8/1996 | Brewer et al. | 715/709 |
| 5,671,351 A * | 9/1997 | Wild et al. | 714/38 |
| 5,781,720 A * | 7/1998 | Parker et al. | 714/38 |
| 5,825,356 A | 10/1998 | Habib et al. | 345/338 |
| 5,890,178 A | 3/1999 | Haneda | 715/203 |
| 5,926,638 A * | 7/1999 | Inoue | 714/38 |
| 6,061,643 A * | 5/2000 | Walker et al. | 702/123 |
| 6,219,047 B1 | 4/2001 | Bell | |
| 6,226,785 B1 | 5/2001 | Peterson et al. | 717/106 |
| 6,239,800 B1 * | 5/2001 | Mayhew et al. | 715/764 |
| 6,243,707 B1 | 6/2001 | Humpleman et al. | 707/102 |
| 6,307,544 B1 | 10/2001 | Harding | 715/709 |
| 6,308,146 B1 * | 10/2001 | La Cascia et al. | 703/22 |
| 6,434,629 B1 | 8/2002 | Stearns et al. | |
| 6,504,554 B1 * | 1/2003 | Stone et al. | 715/760 |
| 6,532,023 B1 | 3/2003 | Schumacher et al. | 345/704 |

(Continued)

FOREIGN PATENT DOCUMENTS

EP    1 437 648    7/2004

(Continued)

OTHER PUBLICATIONS

European Search Report from Application No. EP 05 10 7922.

(Continued)

*Primary Examiner*—Robert Beausoliel
*Assistant Examiner*—Jeison C Arcos
(74) *Attorney, Agent, or Firm*—Christopher R. Christenson; Westman, Champlin & Kelly, P.A.

(57) ABSTRACT

Automated testing of active content wizards is provided. A test infrastructure (TI) accesses a list of ACW to test and controls an ACW runtime engine to execute the ACWs. During ACW execution, the TI interacts with the ACW runtime engine to inject simulated user information based upon test information stored relative to each ACW. The TI records errors generated by the ACW runtime engine as well as other errors relative to the ACW. The TI also directs cleanup of the operating environment between each ACW test. Reports of ACW failures can be provided to ACW authors and/or other interested entities for improvement.

17 Claims, 4 Drawing Sheets

U.S. PATENT DOCUMENTS

| | | | |
|---|---|---|---|
| 6,662,225 B1 | 12/2003 | Motoyama et al. | 709/224 |
| 6,862,682 B2 | 3/2005 | Louden et al. | 713/2 |
| 6,948,152 B2 * | 9/2005 | Dubovsky | 717/124 |
| 6,966,013 B2 * | 11/2005 | Blum et al. | 714/38 |
| 7,024,658 B1 | 4/2006 | Cohen et al. | 717/117 |
| 7,036,079 B2 | 4/2006 | McGlinchey et al. | 715/704 |
| 7,047,498 B2 * | 5/2006 | Lui et al. | 715/762 |
| 7,055,136 B2 * | 5/2006 | Dzoba et al. | 717/125 |
| 7,055,137 B2 * | 5/2006 | Mathews | 717/125 |
| 7,185,286 B2 * | 2/2007 | Zondervan et al. | 715/762 |
| 7,305,659 B2 * | 12/2007 | Muller et al. | 717/127 |
| 7,426,734 B2 | 9/2008 | Debique et al. | |
| 2002/0154153 A1 | 10/2002 | Messinger et al. | 345/705 |
| 2003/0020751 A1 | 1/2003 | Safa et al. | 345/760 |
| 2003/0208712 A1 | 11/2003 | Louden et al. | 714/742 |
| 2003/0222898 A1 * | 12/2003 | Macomber et al. | 345/709 |
| 2004/0010513 A1 | 1/2004 | Scherr et al. | 707/104.1 |
| 2004/0130572 A1 * | 7/2004 | Bala | 345/762 |
| 2004/0215587 A1 | 10/2004 | Bertrand et al. | |
| 2004/0261026 A1 | 12/2004 | Corson | 715/704 |
| 2005/0033713 A1 | 2/2005 | Bala et al. | |
| 2005/0050135 A1 | 3/2005 | Hallermeier | |
| 2005/0114785 A1 | 5/2005 | Finnigan et al. | |
| 2006/0010420 A1 | 1/2006 | Peterson et al. | 717/106 |
| 2006/0206866 A1 | 9/2006 | Eldrige et al. | |

FOREIGN PATENT DOCUMENTS

| | | |
|---|---|---|
| WO | 97/35253 | 9/1997 |

OTHER PUBLICATIONS

"Spreadsheet Formula Highlighting Tool," IBM Technical Disclosure Bulletin, IBM Corp., New York, US, Nov. 1, 1989, pp. 130-131.
"Method for Gulding Users Through an Application," Research Disclosure, Mason Publications, Hampshire, GB, Jun. 1, 1993, p. 429.
U.S. Appl. No. 10/944,688, filed Sep. 17, 2004, Finnigan et al.
U.S. Appl. No. 10/887,543, filed Jul. 8, 2004, McGlinchey et al.
U.S. Appl. No. 10/887,414, filed Jul. 8, 2004, McGlinchey et al.
U.S. Appl. No. 10/337,745, filed Jan. 7, 2003, Bala et al.
U.S. Appl. No. 10/887,058, filed Jul. 8, 2004, Bala et al.
International Search Report from Application No. PCT/US04/22450, filed Jul. 8, 2004.
C.F. Drew, "A Natural Language Interface for Expert System Help Desk", IEEE Conference on Managing Expert System Programs and Projects, pp. 209-215, Sep. 10-12, 1990.
J. Marx et al., "Wing: An Intelligent Multimodal Interface for a Materials Information System", $14^{th}$ Information Retrieval Colloquium, pp. 67-78, Apr. 13-14, 1992.
S. Di Segni, "Goethe: A Natural Language Help System in Prolog an Experiment with the Lexicon Driven Approach", Thirteenth International Conference Artificial Intelligence Expert Systems Natural Language, Avignon, France, vol. 3, pp. 223-232, May 24-28, 1993.
Third Official Action from Chinese Patent Application 200410001642.X dated Apr. 25, 2008.
Official Action from Russian Patent Application 2004100523 dated Apr. 1, 2008.
Examination Report from European patent application 03028648.8, dated Oct. 26, 2006.
Examination Report from European patent application 03028648.8, dated Nov. 2, 2007.
First Office Action from Chinese patent application 200480043312.5, dated Sep. 28, 2007.
Second Office Action from Chinese patent application 200410001642.X, dated Oct. 19, 2007.
Second Office Action from Mexican patent application Pa/a/2003/011916, filed Dec. 18, 2003.
Communication from European patent application 05107922.6, dated Oct. 19, 2007.
Examiner's first report from Australian patent application 2003270997, dated Feb. 23, 2009.
First Notice of Rejection from Japanese patent application 2004-002455, dated Nov. 7, 2008 (translation).
"Microsoft's HTML Help," Microsoft Interactive Developer, No. 3, pp. 37-43, Sep. 18, 1997.

* cited by examiner

ACTIVE CONTENT WIZARD TESTING

RELATED APPLICATIONS

Patent application Ser. No.; 10/887,414, filed Jul. 8, 2004, entitled Automatic Image Capture for Generating Content; application Ser. No. 10/337,745, filed Jan. 7, 2003, entitled Active Content Wizard: Execution of Tasks and Structured Content; U.S. patent application Ser. No.; 10/887,058, filed Jul. 8, 2004, entitled Automatic Text Generation; U.S. patent application Ser. No.; 10/887,543 filed Jul. 8, 2004, entitled Importation of Automatically Generated Content, and assigned to the same assignee as the present invention.

BACKGROUND OF THE INVENTION

The present invention deals with generating content, such as help content. More specifically, the present invention deals with importation of automatically generated content indicative of actions of a user on a user interface.

The Graphical User Interface (GUI) is a widely used interface mechanism. GUI's are very good for positioning tasks (e.g. resizing a rectangle), visual modifier tasks (e.g. making something an indescribable shade of blue) or selection tasks (e.g. this is the one of a hundred pictures I want rotated). The GUI is also good for speedy access to quick single step features. An application's GUI is a useful toolbox that is organized from a functional perspective (e.g. organized into menus, toolbars, etc) rather than a task oriented perspective (e.g. organized by higher level tasks that users want to do, such as "make my computer secure against hackers").

However, GUIs present many problems to the user as well. Using the toolbox analogy, a user has difficulty finding the tools in the box or figuring out how to use the tools to complete a task composed of multiple steps. An interface described by single words, tiny buttons and tabs forced into an opaque hierarchy does not lend itself to the way people think about their tasks. The GUI requires the user to decompose the tasks in order to determine what elements are necessary to accomplish the task. This requirement leads to complexity. Aside from complexity, it takes time to assemble GUI elements (i.e. menu clicks, dialog clicks, etc). This can be inefficient and time consuming even for expert users.

One existing mechanism for addressing GUI problems is a written help procedure. Help procedures often take the form of Help documents, PSS (Product support services) KB (Knowledge base) articles, and newsgroup posts, which fill the gap between customer needs and GUI problems. They are analogous to the manual that comes with the toolbox, and have many benefits. These benefits include, by way of example:

1) Technically speaking, they are relatively easy to author even for non-technical authors;
2) They are easy to update on a server so connected users have easy access to new content; and
3) They teach the GUI thereby putting users in control of solving problems.

However, Help documents, PSS KB articles and newsgroups have their own set of problems. These problems include, by way of example:

1) Complex tasks require a great deal of processing on the user's part. The user needs to do the mapping from what is said in each step to the GUI. This can lead to errors in that steps are skipped, described incorrectly or inadequately or are described out of order.
2) Troubleshooters, and even procedural help documents, often include state information that creates complex branches within the help topic, making topics long and hard to read and process by the end user. Toolbars may be missing, and may need to be turned on before the next step can be taken. Troubleshooters often ask questions about a state that is at best frustrating (because the troubleshooter should be able to find the answer itself) and at worst unanswerable by non-experts.
3) There are millions of documents, and searching for answers involves both a problem of where to start the search, and then how to pick the best search result from the thousands returned.
4) There is no shared authoring structure. Newsgroup posts, KB articles, troubleshooters and procedural Help documents all have different structures and authoring strategies, yet they are all solving similar problems.
5) For a user, it is simply difficult to read step-by-step text, and then visually search the UI for the element being described and take the action described with respect to that element.

Another existing mechanism for addressing GUI problems is a Wizard. Wizards were created to address the weaknesses of GUI and written help procedures. There are now thousands of wizards, and these wizards can be found in almost every software product that is manufactured. This is because wizards solve a real need currently not addressed by existing text based help and assistance. They allow users to access functionality in a task-oriented way and can assemble the GUI or tools automatically. Wizards allow a program manager and developer a means for addressing customer tasks. They are like the expert in the box stepping the user through the necessary steps for task success. Some wizards help customers setup a system (e.g. Setup Wizards), some wizards include content with features and help customers create content (e.g. Newsletter Wizards or PowerPoint's AutoContent Wizard), and some wizards help customers diagnose and solve problems (e.g. Troubleshooters).

Wizards provide many benefits to the user. Some of the benefits of wizards are that:

1) Wizards can embody the notion of a "task." It is usually clear to the user what the wizard is helping them accomplish. With step-by-step pages, it can be easy for a user to make choices, and in the case of well designed wizards the incidence of the user becoming visually overwhelmed is often reduced.
2) Wizards can automatically assemble and interact with the underlying features of the software and include the information or expertise needed for customers to make choices. This saves the user time in executing the task.
3) Wizards can automatically generate content and can save users time by creating text and planning layout.
4) Wizards are also a good means for asking questions, getting responses and branching to the most relevant next question or feature.

However, wizards too, have their own set problems. Some of these problems include, there are many more tasks that people try to accomplish than there are wizards for accomplishing them. Wizards and IUI (Inductive User Interfaces) do not teach customers how to use underlying GUI and often when the Wizard is completed, users are unsure of where to go next. The cost of authoring of wizards is still high and requires personnel with technical expertise (e.g. software developers) to author the Wizard.

Further, all of these types of content suffer from yet another problem. The steps that must be taken to perform any given task may change based on the configuration of the computer on which the task is to be performed. For instance, changing the background display (or "wallpaper") on a computer may require the user to perform different steps, depending on the operating system of the user's computer. In fact, the steps required may even be different if the version number of the operating system is different. Similarly, the steps may be different depending on the network configuration of the computer (e.g., depending on whether the computer is on a network domain or on a workgroup). This requires the user to author fairly complicated branching logic in the written content.

Thus, authoring all of these types of content that describe procedures to be taken by a user, is often error prone. It is quite easy to miss steps, to describe steps incorrectly, or to lose track of what step is currently being described in a long sequence of UI manipulations. However, this written procedural help content is extremely common. Such help content often ships with products, on-line help content is provided for product support teams, and procedures inside companies are often documented in this way for specific business processes. Thus, this type of information is difficult to author and often contains errors.

In addition, end users must typically follow the steps that have been authored. It can be difficult to read step-by-step text, and then search the UI for the particular control element being described and then to take the proper action with respect to that control element. It has been found that many users find this such a burden that they simply scan the first one or two steps of the text, and then try their best to determine which UI elements need to be actuated next, barely referring back to the written text steps. It has also been found that the eye can find and recognize pictures much more easily than it can read a word, mentally convert the word into a picture, and then find the corresponding UI control element. Yet, in the past, this is exactly what was done, as an author must painstakingly take screenshots of each step, crop the images, and paste them into a document in the right place, in order to have any type of visual depiction of an action to be taken.

Active Content Wizards (ACW's) address these issues by allowing authors to generate specific steps and descriptions thereof with relative ease. Authors simply interact with a user interface, while a recording component records the author's actions. This allows ACW's to be easily created for a vast array of situations. ACW's generally include code, in one form or another, to interact with the user interface, to essentially play a help topic for a user directly to the user interface. Thus, while an ACW is interacting with the user interface, the ACW will also provide a description to the user regarding the interaction. During playback, the ACW may allow the user to interact with the user interface to enter specific information, such as a filename, etc. While ACW's represent a significant advance with respect to helping users interact with computers, the significant degree of help provided by the ACW drives a significant concern that such ACW's be accurate and functional for their intended purpose. Given the facility with which ACW's can now be created, it would be unfortunate if such painstaking ACW checking required any significant additional effort.

SUMMARY OF THE INVENTION

Automated testing of active content wizards is provided. A test infrastructure (TI) accesses a list of ACWs to test and controls an ACW runtime engine to execute the ACWs. During ACW execution, the TI interacts with the ACW runtime engine to inject simulated user information based upon test information stored relative to each ACW. The TI records errors generated by the ACW runtime engine as well as other errors relative to the ACW. The TI can generate an artificial computer state before ACW testing, and can also direct cleanup of the operating environment between each ACW test. Reports of ACW failures can be provided to ACW authors and/or other interested entities for improvement.

DETAILED DESCRIPTION OF ILLUSTRATIVE EMBODIMENTS

The present invention deals with automatically testing active content wizards. Prior to describing the present invention in greater detail, one exemplary environment in which the invention can be used will be discussed.

Figure 1:
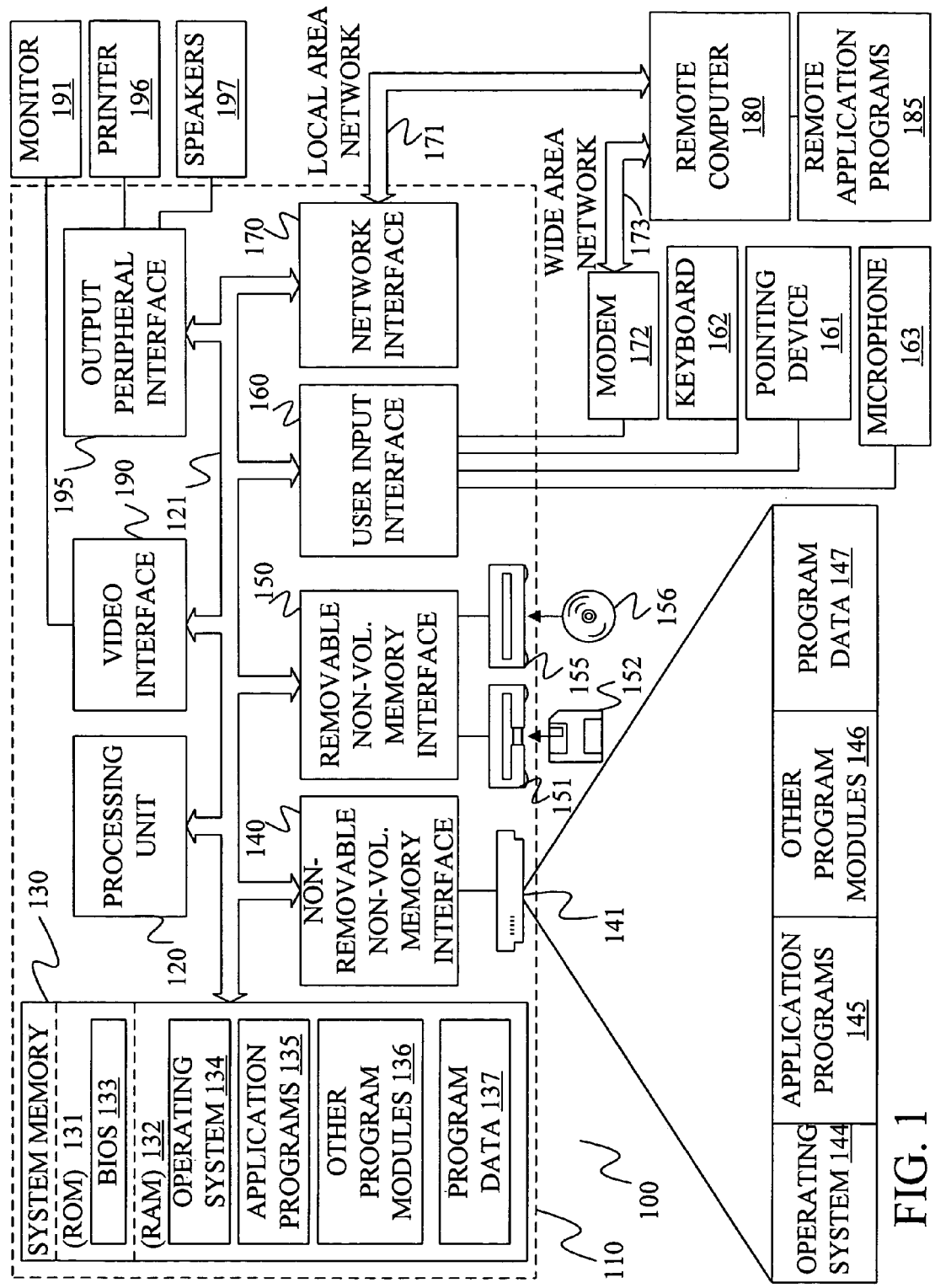
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
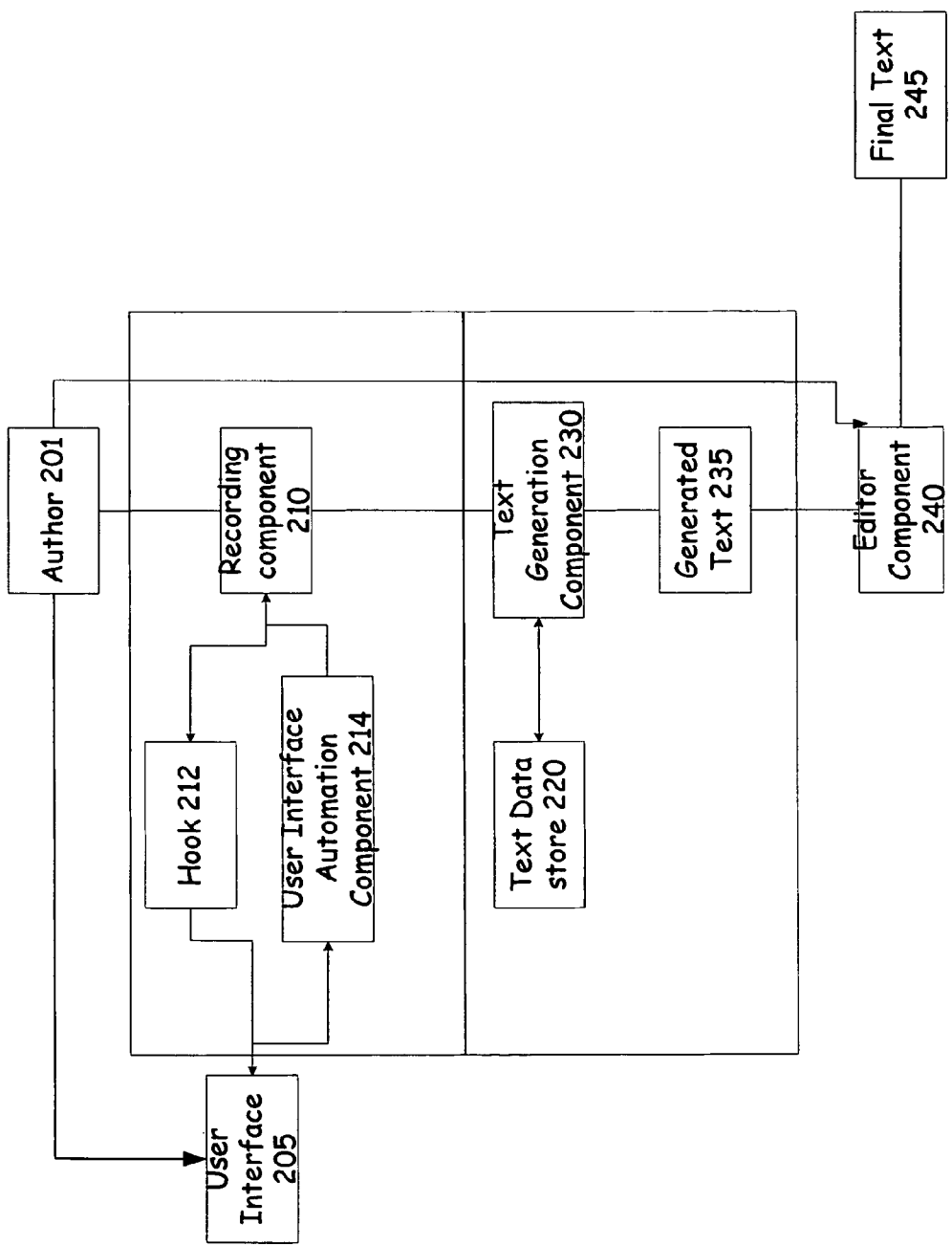
FIG. 2 is a block diagram illustrating the components of an ACW recording system with which embodiments of the present invention are useful.

FIG. 2 is a block diagram illustrating the components of a recording system 200 that can generate active content wizards. While the embodiments of the present invention will be described with respect to active content wizards generated using the arrangement illustrated in FIG. 2, it should be understood that embodiments of the invention include any automated testing of any form of active content wizard. FIG. 2 shows system 200 with recorder 207 and automatic text generator 203. The recorder 207 includes a recording component 210, a hook component 212, and a user interface (UI) automation component 214. The text generator 203 includes a text database (or data store) 220, and text generation component 230. System 200 interacts with a user interface 205. An author can configure the components of system 200 to automatically record images corresponding to actions performed on the controls of user interface 205, and text generator 203 automatically generates text 235 that describes those actions. Author 201 can also edit the automatically generated text 235, or generate text from scratch, on editor 240 to obtain final text 245 describing the task (or UI control actions). Final text 245 can also illustratively include the images embedded therein. A number of the components in FIG. 2 will now be described in greater detail.

User Interface 205 is, in this example, a conventional graphical user interface with controls that allow a user to take actions to perform a task. The user interface 205 is illustratively displayed on display device 191 shown in FIG. 1. This type of graphical user interface (GUI) is a widely used interface mechanism.

Recording component 210 is generally an application program that allows the author 201, or another user, to perform a task on the user interface 205, and records the tasks by capturing images and by recording information retrieved from the automation component 214 for each step in the task. While the author 201 is performing the steps associated with the task on the user interface 205, the recording component 210 records information about what controls and windows the author interacts with on the user interface 205. This information is illustratively provided to the text generator 230 to automatically generate the text in a document, such as a help document.

The recording component 210 interacts with the user interface 205 through the hook component 212 and the user interface (UI) automation component 214. These components can be separate from the recording component 210, or these components can be integral with the recording component 210.

The hook component 212 is generally a module or component within an operating system that is used by the computer. When a hook is set for mouse clicks, for example, information indicative of the mouse click (such as a message) is forwarded to the hook component 212 where it is consumed, and after its associated images and automation information have been recorded by the recording component 210, it is played back for other components in the computer that have registered to receive mouse clicks. Therefore, generally, the hook component 212 acts as a buffer between the operating system and the target application.

The hook component 212 can be configured to look for substantially any input action, such as the type of signal received, e.g. single click, double click, right or left click, keyboard action, touch-sensitive screen input, etc. Once the information representing the action is recorded by the recording component 210, the information representing the mouse click (or whatever action is recorded) is then played back by the hook component 212 to the application. One reason for this is that the user may take a second action before the first action is recorded. The second action may well cause the state of the user interface to change, and thus result in improper recording of the first action. By consuming the first mouse message and playing it back once recording is complete, this ensures that the first action will be recorded properly.

It should also be noted that the functions performed by the hook component 212 (i.e., listening for mouse clicks and playing them back) are illustratively performed on separate threads. This ensures that all user interface actions (e.g., mouse clicks, keyboard actions etc.) will be properly recorded and played back without missing any. Further, the record and playback mechanism of hook component 212 can illustratively override any timeout features that are implicit within the operating system. This can be necessary if the timeout period of the operating system is too short to allow for proper recording of the action.

User interface automation component 214 is illustratively a computer program configured to interpret the atomic steps for the overall task performed by the author or user through the user interface 205. User interface automation component 214 can be a GUI automation module implemented using Microsoft User Interface Automation by Microsoft Corporation of Redmond, Wash. This module provides a programmatic way to access information about the visible user interface, and to programmatically interact with the visible user interface. However, depending on the system setup, the user interface automation component 214 can be implemented using any application that is able to programmatically navigate a graphical user interface and to detect (and optionally programmatically navigate the GUI to perform and execute) commands on the user interface.

User interface automation component 214 thus detects each of the steps associated with the desired task performed on the user interface 205 by author 201 (or another user) in task order. For instance, as is described in greater detail below, when the task requires the user to click a button on the GUI to display a new menu or window, user interface automation component 214 determines which control is located at the position of the mouse cursor on user interface 205 and its size and its parent window. The recording component 210 uses information from hook component 212 (e.g., the type, name and state of the control) to record the name and properties of the control that was used to perform the step. This information is provided from the user interface automation component 214 and hook component 212 to the recording component 210 such that the recording component 210 can record the information from hook 212 and automation component 214.

Text generation component 230 is a program or module configured to generate natural language text that describes the actions executed or performed during the recording process. The text generation component 230 uses the recorded images and other information recorded by the recording component 210 to search database 220 and to choose a correct template or entry from the text database 220 that corresponds to the recorded step.

Text database 220 is illustratively a database or other information storage system that is searchable by the text generator 230. Text database 220 contains information related to the controls that are available on the user interface 205. This information can include, for example, the name of the control, the type of control, the action performed on the control, and a textual description of the action as a natural language sentence.

The textual description for the entry can be provided in multiple languages. When the textual description is provided in multiple languages, a language identifier is provided with each entry that allows the correct language to be selected.

Depending on the needs of the system, other information can be provided in the text database 220. For example, some entries in the text database 220 have information related to two or more actions exemplified by multiple controls that are performed in sequence. Where multiple actions on multiple controls are represented by a single entry in the text database 220 the text for the entry contains natural language descriptions of the action performed on both controls as a single sentence. By combining the description of the two commands as a single sentence, the readability of the final text document is improved.

The text database 220 can be written in Extensible Markup Language (XML). The data for each entry can be stored as a series of subentries, where each subentry of the entry refers to an individual piece of information that is needed to identify the task. However, other formats can be used for storing the data.

Text generation component 230 generally looks at two or more of the recorded actions when searching for entries in the text database 220. This can be done in order to provide a more fluid text document. For instance, good procedural documentation often combines more than one step into a single sentence as an enhancement to readability. If the text generation component 230 identifies two or more that match the recorded information in the text database 220, the text generation component 230 can use any known method to determine which entry in the database to choose, such as by disambiguating the entries based on scoring each entry, and selecting the entry that has the highest score.

Based on the type of the control actuated on the user interface, and the performed action, the text generation component 230 can search the text database 220 for an entry that matches the executed control type and action. Once a match is identified in the text database 220, the text generation component 230 obtains the associated natural language description of the action from the text database 220, and places it as a sentence instruction in the generated text document 235. Alternatively, the text generation component 220 can also generate an executable version of the text document based on the information provided by the UI automation module 214.

When choosing a textual description from the text database 235, the text generation component can also look to the state of the control. This can be important when the control is a checkbox or an expandable or collapsible tree. In this case merely clicking on the box may not be appropriate to describe the action, as the action on the control is the same regardless of the desired result. Therefore, in these cases, the new state of the control will influence the selected text. For example, if the control is a check box and it is to be deselected, the text matched would be based on the new state of the control plus the control's name.

Text editor 240 is an editor configured to correct, change, or add information or text to the automatically generated text 235. Depending on the resultant text generated by text generator 230, and the actions performed by the author, it may be necessary to edit the text to further enhance its understandability. Therefore, text editor 240 receives the generated text 235, and allows the author 201 to edit the generated text.

Text editing may be required, for example, because of a grammatical necessity or because one of the recorded steps required a user action, and the system did not request the description of the user action at the time it was recorded. In such a case (when a user input is required), while performing the task to be recorded according to one embodiment, the text generator 235 only provides a space in the text for the author to provide an instruction/description of what the user should do at this step.

For example, assume that the task being performed by the user and recorded by the recording component is to change the background paneling on the computer screen. This requires the user to choose a pattern for the background. Therefore, the text that is returned by the text database for a recorded user action to change the background can be "Please select [insert description of action]", where the author will then edit the text to read "Please select the desired background from the list." Also during the editing stage the author 201 can provide a description of the overall task if this was not provided prior to recording the task. Once the text has been edited the final text 245 is output from the authoring tool 200 and is stored in an appropriate storage mode that allows for the final text to be retrieved by a user when desired.

Figure 3:
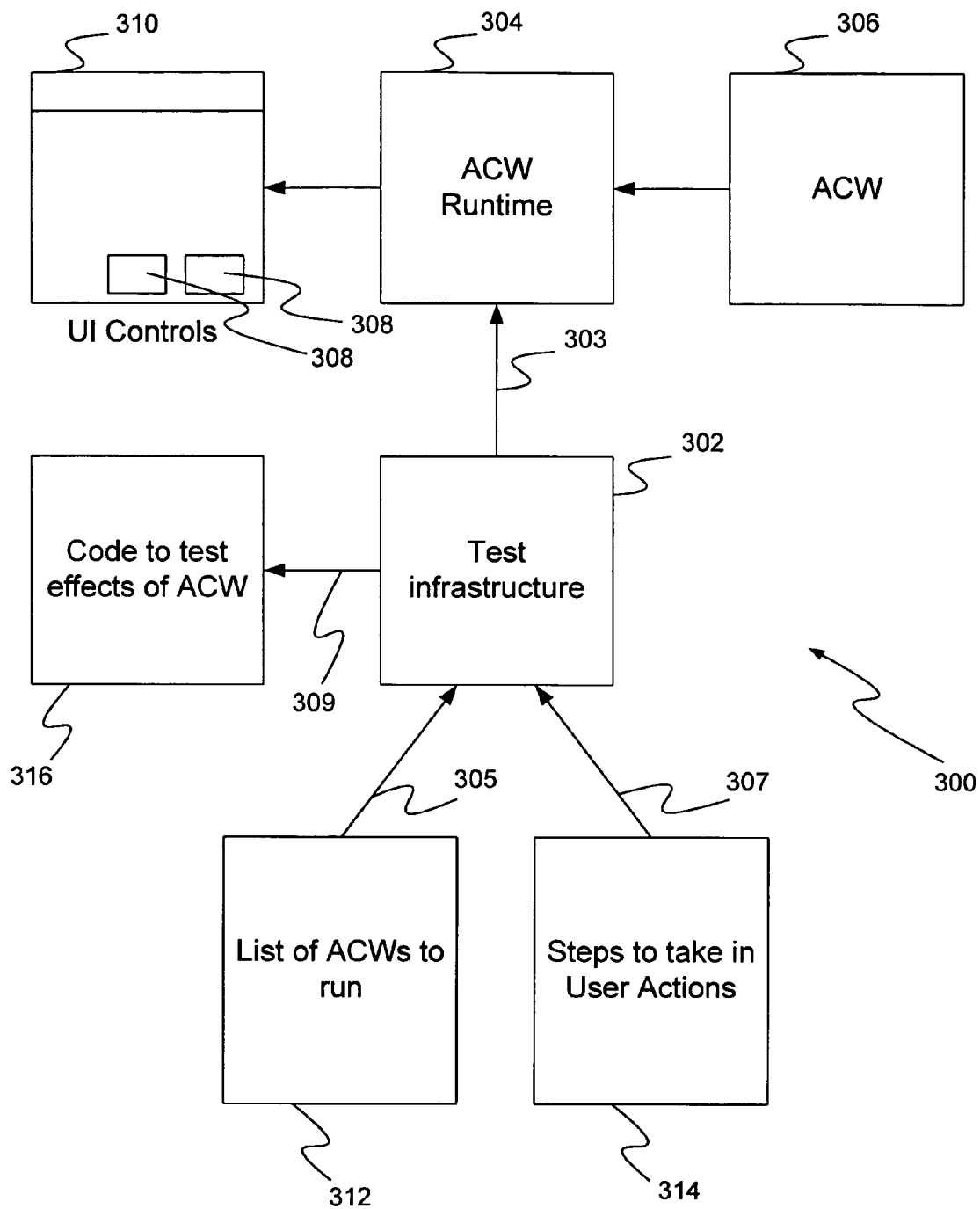
FIG. 3 is a block diagram of a system for automatically testing ACW's in accordance with an embodiment of the present invention.

FIG. 3 is a diagrammatic view of a system for automatically testing ACWs in accordance with an embodiment of the present invention. At the heart of system 300 is test infrastructure (TI) 302. Test infrastructure 302 can be any suitable program module that is able to interact with ACW runtime engine 304. TI 302 includes an interface 303 for interacting with ACW runtime engine 304. TI 302 also includes communication channels 305 and 307 for obtaining list 312 and test information 314, respectively. Optionally, TI 302 can include a channel 309 to external code, which will be described in greater detail later in the specification. Runtime engine 304 can be embodied as user interface automation component 214, described above with respect to FIG. 2, or can be a separate module that interacts with module 214.

ACW runtime engine 304 is able to execute an ACW provided to it, such as ACW 306, and automatically interact with one or more controls 308 on GUI 310 in a programmatic manner. In accordance with an embodiment of the present invention, TI 302 communicates with and controls ACW runtime engine 304 in order to effect automated testing of one or more ACWs. TI 302 can invoke ACW runtime 304 and pass it the ACW to be executed, or data indicative thereof. TI 302, upon initialization, will access a list 312 of ACWs to be tested. List 312 can be stored on the same physical computer as TI 302, as well as remotely therefrom. Upon initialization, TI 302 will select an ACW in list 312, and invoke ACW runtime to execute the selected ACW. Optionally, TI 302 can call suitable code to set up the system prior to invoking the ACW script. For example, TI 302 might open additional windows, or set a specific state on the machine. This arbitrary, optional set up could be used to set the machine to a specific state in order to attempt to confuse the ACW script, or otherwise cause the ACW script to fail. The arbitrary setup information can be generated by the ACW author and provided with the ACW script, or the set up information can be created by any other suitable entity. Some ACWs will require user interaction, such as a mouse-click, or text entry. In order to provide such interaction, TI 302 accesses one or more files 314 that contain testing information relative to the ACW under test. Files 314 are preferably provided with each ACW, but can be provided separately. Additionally, files 314 can be stored remotely from TI 302, such that files 314 can be updated and/or changed by a suitable entity, such as the appropriate ACW author. During execution of the selected ACW, TI may check the result of the ACW by calling external code 316. The called external code will return an indication to TI 302 relative the result of the ACW, such that an overall indication of ACW function is obtained.

Figure 4:
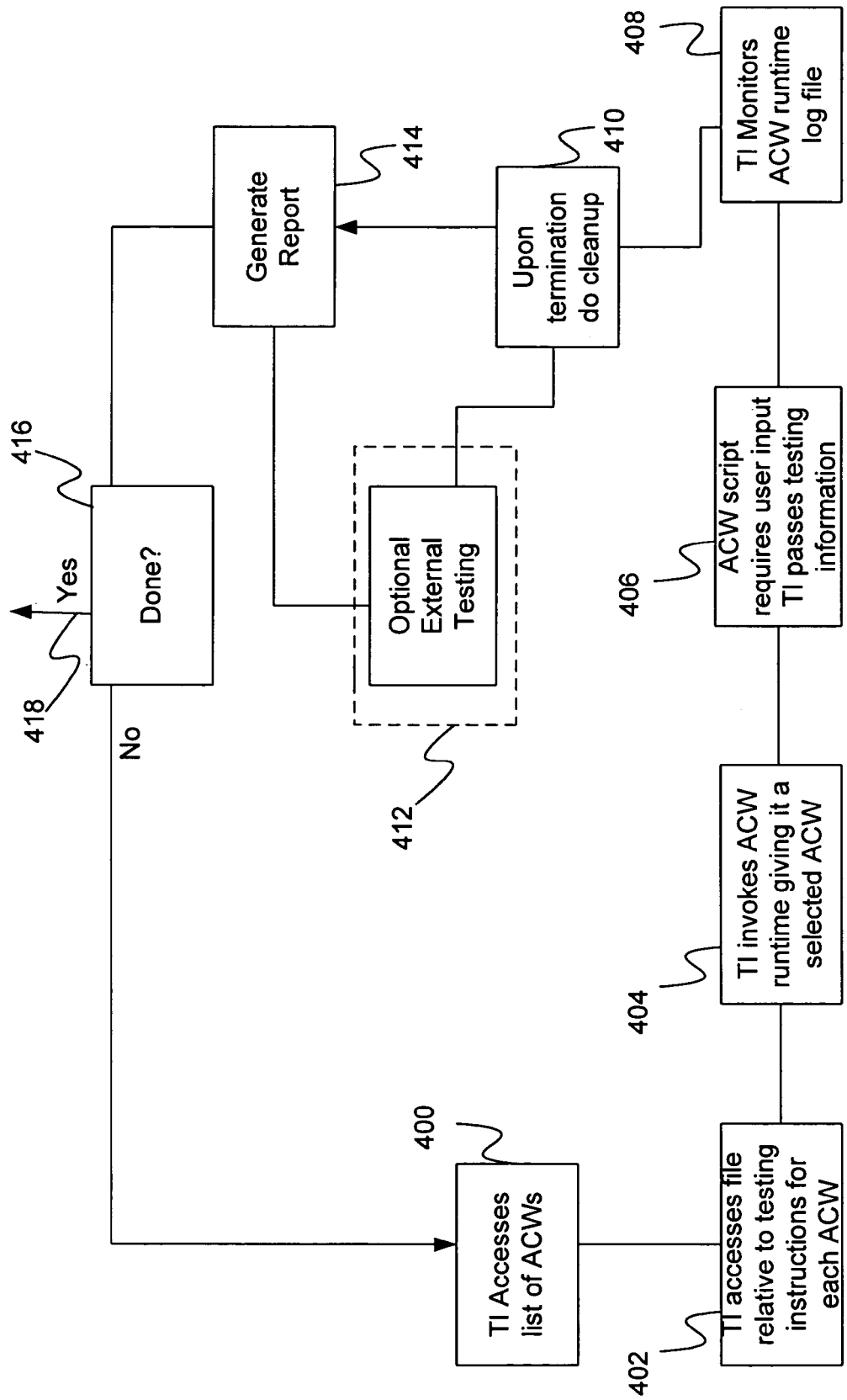
FIG. 4 is a flow diagram of automatic ACW testing in accordance with an embodiment of the present invention.

FIG. 4 is a block diagram of a method for automatically testing one or more ACW's in accordance with an embodiment of the present invention. Automatic ACW testing is important because it allows an ACW to be tested to make sure it works as intended. Further, automated testing helps ensure that ACW's are still valid when the operating environment changes, such as when an operating system is updated. Further still, automated testing allows extensive testing to be performed with relatively little effort. For example, ACWs written for an Administrator can be done using power user privileges to ensure that the ACW is relevant and accurate for not only the administrator, but also the power user. Automated testing will also facilitate creation of ACW's in other languages. For example, English-language ACW's could be tested against a German operating system build to isolate ACW that require further work before being effective in German.

The method begins at block 400 where TI 302 accesses list 312 of ACWs that are to be tested. Initially, TI 302 selects the first ACW to be tested, and subsequent ACWs are selected on subsequent passes until all ACWs have been tested sequentially. There may be, for example, 100 or more ACWs list 312 accessed by TI 302. Examples of ACWs include, "Change Desktop Background" and "Delete Internet History". List 312 is preferably in an initialization file that is in XML form, but may be in any suitable form.

At block 402, TI 302 accesses information relative to user actions that are to be taken during execution of the selected ACW as well as testing information that should be provided by TI 302 to ACW runtime engine 304 in order to simulate the user's actions. This information is preferably provided with each ACW. Examples, of this information include types of user interaction (e.g. mouse-clicks, text entry, etc.) as well as the specific information to be entered (e.g. path, filename). For example, in the "Change Desktop Background" ACW, there is a user action highlighting the list of pictures to choose from. Each ACW can be run multiple times with each iteration simulating different user interaction. This iteration can be controlled by listing the ACW multiple times in the list 312, or by suitably adapting the ACW information 314 provided with the ACW to indicate that the test should loop. The ACW can also be tested multiple times with the same user-simulated interaction.

At block 404 ACW runtime engine 304 is invoked by TI 302 and the ACW under test, such as ACW 306, is passed to ACW runtime engine 304. As the ACW executes, TI 302 interacts with ACW runtime engine 304, as indicated at block 406, to inject simulated user actions/data based upon the test information 314 accessed during block 402. For example, at block 406, TI 302 could invoke ACW runtime engine to execute the "Change Desktop Background" ACW. Then, as the ACW executes, and requests user interaction, TI 302 will access testing information 314 to determine how to respond. For example, when the ACW requests a user to select a file to use as the desktop background, TI 302 would enter text information 314 such as a specific filename.

At block 408, TI 302 listens (for example by monitoring one or more log-files of ACW runtime engine 304) for errors. For example, if engine 304 fails to find a control that it was expecting, or encounters an unexpected dialog, TI 302 will note the problem. In the "Change Desktop Background" example, the OK button on the Desktop Background dialog might be disabled if the user is not an administrator. In such case, the ACW will fail and write the fact that has failed to a log-file. TI 302 will note the error by reviewing the log-file runtime engine 304 and create its own record of the error. Thus, the TI is essentially handling the ACW run-time to ensure that if the ACW run-time encounters any problem, TI 302 will ultimately store a record of the problem and continue testing other ACW's. TI 302 also stores a record of any problems that it independently encounters when the test is run. For example, TI 302 may set a timeout period within which the ACW must complete. Even if ACW run-time engine 304 fails to recognize any errors in an ACW, the expiration of the TI timeout period for the ACW will generate an error that TI 302 will recognize and record. Thus, records will be made of errors in ACW content as well as errors in the manner in which the ACW runtime engine 304 executes and reacts. A significant number of errors directed to ACW runtime engine 304 might indicate that the runtime engine itself should be reviewed or revised in order to reduce errors and enhance robustness.

At block 410, when the ACW completes, prematurely or not, TI 302 will clean up the environment to ensure that it is ready for the next ACW. This ensures that the environment does not adversely impact a subsequent ACW test. During execution of a specific ACW, many windows and/or dialogs may be opened for a user. These interactions are tracked by TI 302, such that they can be subsequently closed if the ACW should fail to close them itself. Essentially, any change that a given ACW makes to its environment during execution is preferably tracked, such that the change can be undone. This is also important, because ACWs will not generally be designed to simply undo their changes after completion. Given that they are being executed as a test, it is important that all such changes be undone. This could include restoring user settings that could affect the outcome of other ACW tests.

At optional block 412, external code 316 is called to verify that the ACW did what it was intended to do. External code 316 can be any suitable code, and may be included with the ACW when it is shipped. The results of the external code call are fed back to TI 302 via any suitable method. An example of this is where TI 302 calls code 316 determine whet the current desktop background is after the "Change Desktop Background" ACW has finished attempting to change the desktop background to "silver.bmp". Code 316, and ultimately TI 302, will note that the current background is not "silver.bmp" which it was expecting. Thus, the external code is used to validate the task that the ACW intended to complete.

At block 414, TI 302 creates a report of the passes and failures complete with details of the failure cases. These details may have been generated by ACW runtime engine 304 during ACW execution, and/or by TI 302. These reports can later be provided the relevant ACW author(s) for explanation and/or ACW rework/revision. Once an ACW has completed its test, TI 302 checks, at block 416, to see if the just-completed ACW was the last ACW in list 312. If so, the method ends as indicated at reference numeral 418. However, if more ACWs remain to be tested, the method repeats by returning to block 400 where TI 302 selects the next ACW for testing.

Embodiments of the present invention allow extension ACW testing to be performed with very little additional effort. Such extensive testing facilitates the provision of more accurate, useful and relevant help content to users of computers. Additionally, when such content is to be extended to other platforms and/or languages, the automated testing provided herein will reduce the time required for such content to be made available.

Although the present invention has been described with reference to particular embodiments, workers skilled in the art will recognize that changes may be made in form and detail without departing from the spirit and scope of the invention.

What is claimed is:

1. A method of testing at least one active content wizard, the method comprising:
   providing a list of a plurality of ACW to be tested wherein each ACW includes code to interact with a user interface to play a help topic to the user interface;
   accessing testing information relative to the plurality of ACWs;
   executing the plurality of ACWs with a GUI automation module;
   injecting at least one simulated user input during execution of each ACW; and
   recording data relative to the execution of each ACW.

2. The method of claim 1, wherein a testing infrastructure (TI) access the list and accesses the testing information relative to the at least one ACW, and wherein the TI invokes the GUI automation module.

3. The method of claim 2, wherein the TI monitors a log-file of the GUI automation module to obtain error information relative to each ACW.

4. The method of claim 2, wherein the TI sets a timeout period within which each ACW test must be completed.

5. The method of claim 2, wherein the TI calls external code to verify a result of each ACW.

6. The method of claim 2, wherein the TI creates an arbitrary machine state prior to invoking the GUI automation module.

7. The method of claim 2, and further comprising cleaning up a computing environment between testing different ACWs.

8. The method of claim 1, wherein the list is in XML format.

9. The method of claim 1, wherein the testing information relative to the plurality of ACW includes a nature of user input expected to be requested by each ACW during execution.

10. The method of claim 9, wherein the simulated user input is injected based upon the testing information relative to the plurality of ACWs.

11. The method of claim 1, wherein the method is repeated for a given ACW.

12. The method of claim 11, wherein simulated user input is different for each iteration.

13. The method of claim 1, wherein recording data relative to the execution of each ACW includes recording whether each ACW passed the test.

14. The method of claim 1, wherein recording data relative to the execution of each ACW includes recording a failure type.

15. The method of claim 14, wherein the failure type is generated by the GUI automation module.

16. The method of claim 14, wherein the failure type is generated by a test infrastructure.

17. The method of claim 1, and further comprising generating a report based upon the data recorded relative to execution of each ACW.

* * * * *